(12) United States Patent
Le

(10) Patent No.: US 11,836,613 B2
(45) Date of Patent: Dec. 5, 2023

(54) NEURAL PROGRAMMER INTERPRETERS WITH MODELED PRIMITIVES

(71) Applicant: INTERNATIONAL BUSINESS MACHINES CORPORATION, Armonk, NY (US)

(72) Inventor: Tung D. Le, Ichikawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 960 days.

(21) Appl. No.: 16/514,528

(22) Filed: Jul. 17, 2019

(65) Prior Publication Data

US 2021/0019613 A1    Jan. 21, 2021

(51) Int. Cl.
*G06F 16/23* (2019.01)
*G06N 3/08* (2023.01)

(52) U.S. Cl.
CPC ..................... *G06N 3/08* (2013.01)

(58) Field of Classification Search
CPC ........ G06N 3/0445; G06N 3/08; G06N 3/084; G06N 3/105
See application file for complete search history.

(56) References Cited

U.S. PATENT DOCUMENTS

| | | | |
|---|---|---|---|
| 7,448,022 B1 * | 11/2008 | Ram | G06F 9/45504 717/120 |
| 2017/0140271 A1 | 5/2017 | Reed et al. | |
| 2020/0233855 A1 * | 7/2020 | Masud | G06F 16/2365 |

OTHER PUBLICATIONS

Jonathon Cai, "Making Neural Programming Architectures Generalize Via Recursion", arXiv:1704.06611v1 [cs.LG] Apr. 21, 2017.
Da Xiao et al., "Improving the Universality and Learnabil-ity of Neural Programmer-Interpreters With Combinator Abstraction", arXiv:1802.02696v1 [cs.LG] Feb. 8, 2018.
Neel Kant, "Recent Advances in Neural Program Synthesis", arXiv:1802.02353v1 [cs.AI] Feb. 7, 2018.
Scott Reed et al., "Neural Programmer-Interpreters", rXiV:1511.06279v4 [cs.LG] Feb. 29, 2016.

* cited by examiner

*Primary Examiner* — Yong J Choe
(74) *Attorney, Agent, or Firm* — Tutunjian & Bitetto, P.C.; Robert Richard Aragona

(57) ABSTRACT

Methods and systems for generating a program include parameterizing a high-order function to replace data with primitive functions. A neural programmer interpreter (NPI) model is trained for the high-order function. Respective neural network models are trained for each primitive function. The neural network models generate data for the NPI model when called.

20 Claims, 7 Drawing Sheets

NEURAL PROGRAMMER INTERPRETERS WITH MODELED PRIMITIVES

BACKGROUND

The present invention generally relates to neural programmer interpreters and, more particularly, to learning programs using neural programmer interpreters to learn the program's structure and using a neural network to learn the specific data handling of its primitives.

Neural programmer interpreters (NPIs) use a set of execution traces from a program to replicate that program. An NPI can thereby take an existing program and generate a new program that generates the same outputs given the same inputs. However, it is not easy to provide a provable guarantee of generalization, such that the generated program can be proven to generate the same outputs as the original program for any inputs. This is because the NPI uses a user-defined external environment that can vary according to the problem and because the input data may not be fully representative of the possible inputs. Further, any mistake in the NPI's design can have an impact on its generalizability.

SUMMARY

A method for generating a program includes parameterizing a high-order function to replace data with primitive functions. A neural programmer interpreter (NPI) model is trained for the high-order function. Respective neural network models are trained for each primitive function. The neural network models generate data for the NPI model when called.

A system for generating a program includes an NPI trainer configured to parameterize a high-order function to replace data with primitive functions and to train an NPI model for the high-order function. A primitive model trainer is configured to train respective neural network models, for each primitive function, that generate data for the NPI model when called.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention separate the task of a neural programmer interpreter (NPI) into two parts that are learned independently. The first part deals with the structure of a high-order function, handling structural recursion features. This first part can be trained by NPI. The second part deals with the specifics of the particular program by creating a layer of abstraction—primitive functions that are called by the high-order functions are handled with abstract representations. These primitive functions are then trained by a separate neural network using the specifics of the input data. When the program generated by the present embodiments is executed, it calls the model of the primitive function to determine the appropriate data values to use in a given instance.

The high-order functions can then be trained only once and can be reused, while the primitive functions are simple to train with little data. This makes it easier to design training data for the generated program and improves its generalizability. The programs generated by the present embodiments can be used for a variety of purposes. For example, in language recognition applications, there is a problem of verifying whether the brackets in certain types of markup languages, such as XML and HTML, are correctly matched. In robotic navigation applications, the present embodiments can be used to generate a plan to move from one location to another location.

The present embodiments can thus use programs that operate over limited inputs to learn and generate new programs that can operate on new inputs. To use one example, the present embodiments can take an existing program that can add single-digit numbers and generate a new program that adds n-digit numbers. The present embodiments decrease the burden on users to create good sets of training data. Users need only to prepare a small amount of data for training the primitive functions. Primitive functions are generally very simple (e.g., adding two one-digit numbers) and it is easy to create the training data for them. This provides superior generalization in the output program.

Figure 1:
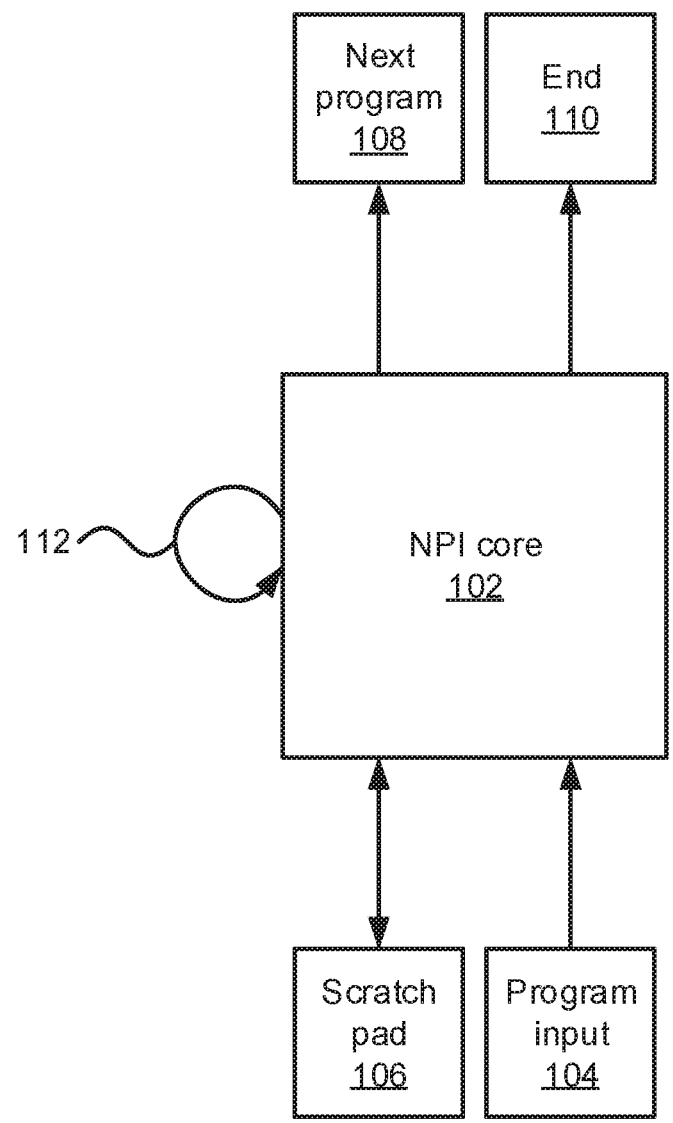
FIG. 1 is a block diagram of a neural programmer interpreter (NPI) model that replicates the functionality of some original program and that separates high-order functions from primitive functions to simplify the generalization of inputs in accordance with an embodiment of the present invention.

Referring now to FIG. 1, a state diagram of an NPI core is shown. The NPI core 102 can be represented using, for example, a neural network based on a long-short term memory architecture, and replicates the function(s) of some original program. The NPI core 102 receives an input 104, for example a set of input data that is used to perform the functions of a represented program. Using this input, the NPI core 102 performs some operation or operation, as dictated by the design of the NPI core. The NPI core 102 can interact with a scratch pad to hold the state of its operation, if multiple steps are needed. When moving from one state to the next, the NPI core 102 can enter a next internal state 112 or can, alternatively, enter a termination state 110 or transfer control to a next program 108. In either the next program transition 108 or the termination transition 110, the NPI core 102 outputs the results of its operations.

It should be understood that the present embodiments implement the NPI core 102 using two different levels of abstraction. AS noted above, the general structure of the NPI core 102 (e.g., determining which operations to perform at a given time) is determined through NPI learning, while the data handling primitives (e.g., assigning values to variables and other elementary operations) are determined through learned neural networks. In some embodiments, the NPI core 102 includes only three sub-programs, including a high-order function call for recursion, a move statement to move pointers in the scratch pad 106, and a write statement that calls a primitive function.

The move statement can take two arguments: an environment row ID that identifies a location of a pointer in the scratch pad 106, and a direction to move the pointer (e.g., left or right). The write statement can also take two arguments: the environment row ID that identifies a location of a value in the scratch pad 106, and a primitive function identifier. It should be noted that the write statement need not encode the actual data to be written—at this high-level expression of the program, it is only the abstract primitive function that is identified. When the write statement is called by the NPI core 102, the primitive function is implemented using a neural network in the manner described below to generate an appropriate data value.

The scratch pad 106 can, for example, include distinct states for an empty list and for a non-empty list. The scratch pad 106 implements an interface for the primitive functions that are called by the NPI core 102. The NPI core 102 and the scratch pad 106 share the identifiers for the primitive functions.

Figure 2:
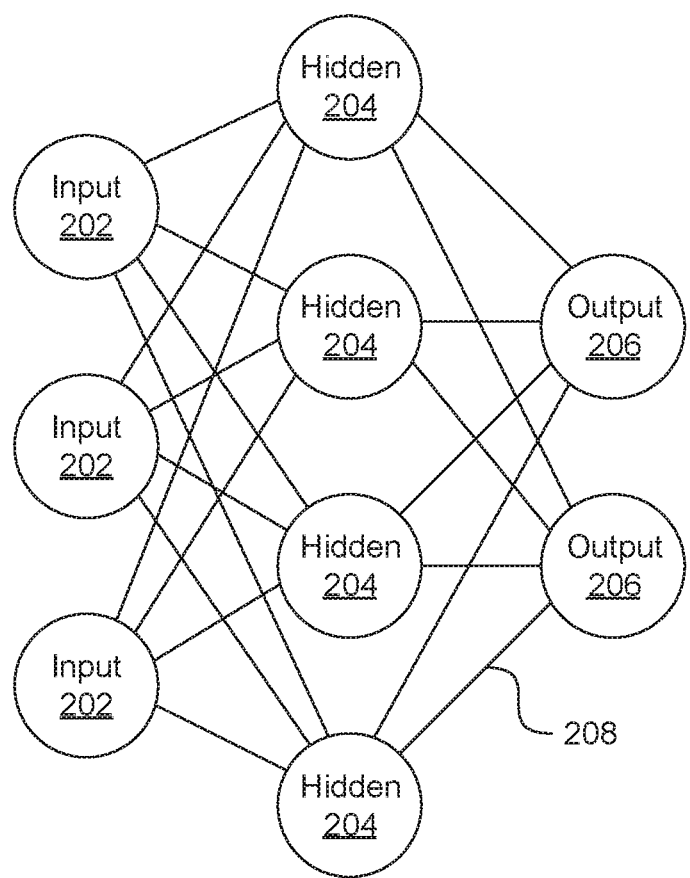
FIG. 2 is a block diagram of an exemplary neural network that illustrates the functional relationships between different layers of a neural network in accordance with an embodiment of the present invention.

Referring now to FIG. 2, an artificial neural network (ANN) is shown to illustrate concepts that can be used to implement the NPI and primitive functions of the present embodiments. An ANN is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

ANNs demonstrate an ability to derive meaning from complicated or imprecise data and can be used to extract patterns and detect trends that are too complex to be detected by humans or other computer-based systems. The structure of a neural network is known generally to have input neurons 202 that provide information to one or more "hidden" neurons 204. Connections 208 between the input neurons 202 and hidden neurons 204 are weighted and these weighted inputs are then processed by the hidden neurons 204 according to some function in the hidden neurons 204, with weighted connections 208 between the layers. There can be any number of layers of hidden neurons 204, and as well as neurons that perform different functions. There exist different neural network structures as well, such as convolutional neural network, maxout network, etc. Finally, a set of output neurons 206 accepts and processes weighted input from the last set of hidden neurons 204.

This represents a "feed-forward" computation, where information propagates from input neurons 202 to the output neurons 206. Upon completion of a feed-forward computation, the output is compared to a desired output available from training data. The error relative to the training data is then processed in "feed-back" computation, where the hidden neurons 204 and input neurons 202 receive information regarding the error propagating backward from the output neurons 206. Once the backward error propagation has been completed, weight updates are performed, with the weighted connections 208 being updated to account for the received error. This represents just one variety of ANN.

Figure 3:
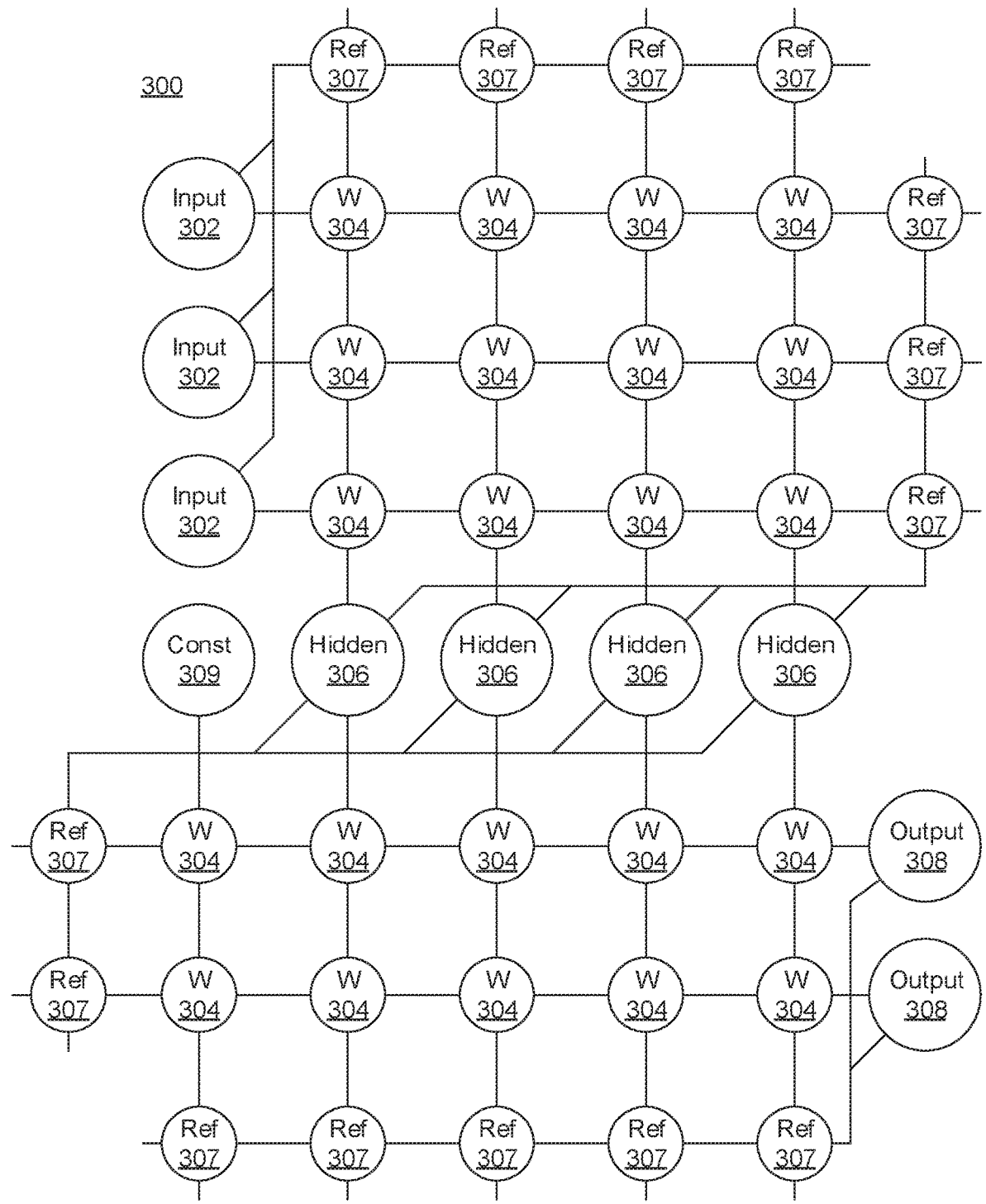
FIG. 3 is a diagram of an exemplary neural network that illustrates a particular structural implementation of a neural network that can be applied to the NPI model and primitive function models in accordance with an embodiment of the present invention.

Referring now to the drawings in which like numerals represent the same or similar elements and initially to FIG. 3, additional detail on an ANN architecture 300 is shown. It should be understood that the present architecture is purely exemplary and that other architectures or types of neural network can be used instead. In particular, while a hardware embodiment of an ANN is described herein, it should be understood that neural network architectures can be implemented or simulated in software. The hardware embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 302 each provide an input voltage in parallel to a respective row of weights 304. In the hardware embodiment described herein, the weights 304 each have a settable resistance value, such that a current output flows from the weight 304 to a respective hidden neuron 306 to represent the weighted input. In software embodiments, the weights 304 can simply be represented as coefficient values that are multiplied against the relevant neuron outputs.

Following the hardware embodiment, the current output by a given weight 304 is determined as $I=V/r$, where V is the input voltage from the input neuron 302 and r is the set resistance of the weight 304. The current from each weight adds column-wise and flows to a hidden neuron 306. A set of reference weights 307 have a fixed resistance and combine their outputs into a reference current that is provided to each of the hidden neurons 306. Because conductance values can only be positive numbers, some reference conductance is needed to encode both positive and negative values in the matrix. The currents produced by the weights 304 are continuously valued and positive, and therefore the reference weights 307 are used to provide a reference current, above which currents are considered to have positive values and below which currents are considered to have negative values. The use of reference weights 307 is not needed in software embodiments, where the values of outputs and weights can be precisely and directly obtained. As an alternative to using the reference weights 307, another embodiment can use separate arrays of weights 304 to capture negative values.

The hidden neurons 306 use the currents from the array of weights 304 and the reference weights 307 to perform some calculation. The hidden neurons 306 then output a voltage of their own to another array of weights 304. This array performs in the same way, with a column of weights 304 receiving a voltage from their respective hidden neuron 306 to produce a weighted current output that adds row-wise and is provided to the output neuron 308.

It should be understood that any number of these stages can be implemented, by interposing additional layers of arrays and hidden neurons 306. It should also be noted that some neurons can be constant neurons 309, which provide a constant output to the array. The constant neurons 309 can be present among the input neurons 302 and/or hidden neurons 306 and are only used during feed-forward operation.

During back propagation, the output neurons 308 provide a voltage back across the array of weights 304. The output layer compares the generated network response to training data and computes an error. The error is applied to the array as a voltage pulse, where the height and/or duration of the pulse is modulated proportional to the error value. In this example, a row of weights 304 receives a voltage from a respective output neuron 308 in parallel and converts that voltage into a current which adds column-wise to provide an input to hidden neurons 306. The hidden neurons 306 combine the weighted feedback signal with a derivative of its feed-forward calculation and stores an error value before outputting a feedback signal voltage to its respective column of weights 304. This back propagation travels through the entire network 300 until all hidden neurons 306 and the input neurons 302 have stored an error value.

During weight updates, the input neurons 302 and hidden neurons 306 apply a first weight update voltage forward and the output neurons 308 and hidden neurons 306 apply a second weight update voltage backward through the network 300. The combinations of these voltages create a state change within each weight 304, causing the weight 304 to take on a new resistance value. In this manner the weights 304 can be trained to adapt the neural network 300 to errors in its processing. It should be noted that the three modes of operation, feed forward, back propagation, and weight update, do not overlap with one another.

As noted above, the weights 304 can be implemented in software or in hardware, for example using relatively complicated weighting circuitry or using resistive cross point devices. Such resistive devices can have switching characteristics that have a non-linearity that can be used for processing data. The weights 304 can belong to a class of device called a resistive processing unit (RPU), because their non-linear characteristics are used to perform calculations in the neural network 300. The RPU devices can be implemented with resistive random access memory (RRAM), phase change memory (PCM), programmable metallization cell (PMC) memory, or any other device that has non-linear resistive switching characteristics. Such RPU devices can also be considered as memristive systems.

Figure 4:
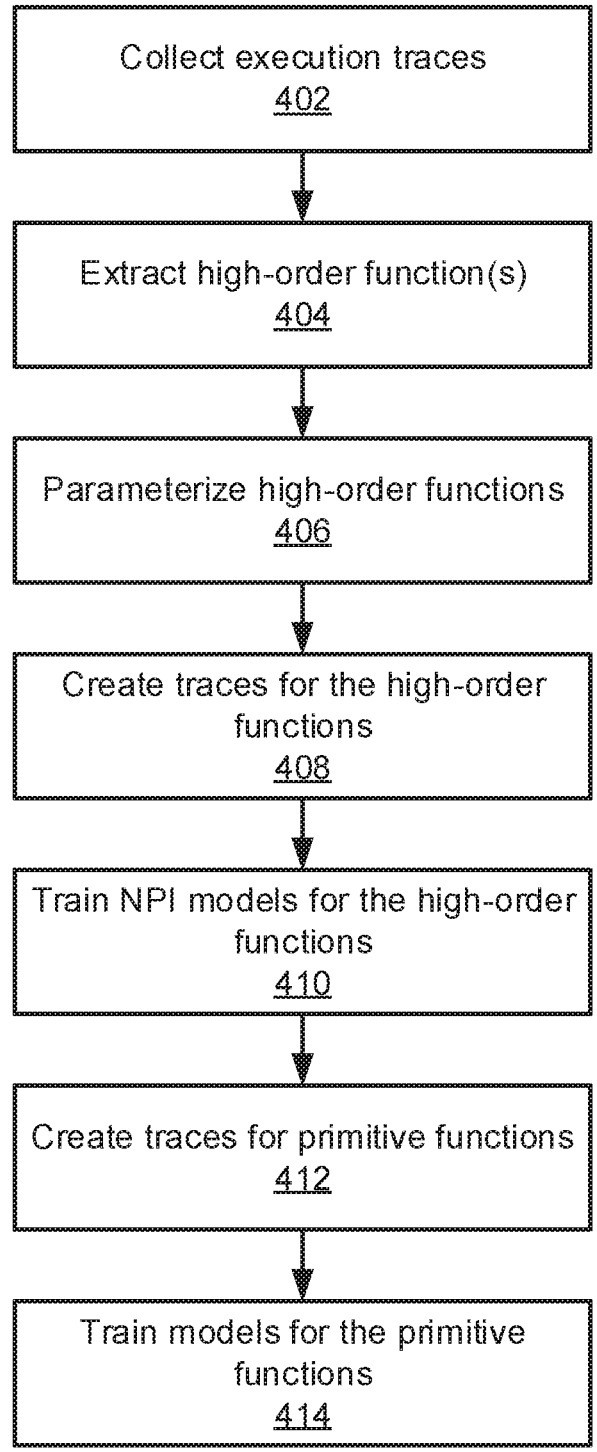
FIG. 4 is a block/flow diagram of a method for generating a new program based on an original program using a two-level NPI learning process that separates high-order functions from primitive functions to simplify the generalization of inputs in accordance with an embodiment of the present invention.

Referring now to FIG. 4, a method for generating a program using two-level NPI is shown. Block 402 accepts as input a set of execution traces for a program that is to be replicated. These execution traces can include, for example, ordered sets of system calls and operations that are performed by the original program for a variety of different inputs and different conditions. It should be understood that the operation of the original program is not directly ascertainable (e.g., the source code is not available and, in some cases, perhaps even the executable binary code is unavailable). Thus the present embodiments seek to replicate the original program using only the records of its execution.

Block 402 can perform a normalization of the input traces. This can include searching for input pointers in each recursive call and replacing them with a new input, for example by tupling them. Thus, if there are two pointer-move operations, MOVE INPUT1_PTR LEFT and MOVE INPUT2_PTR LEFT, then these can be replaced by a new operation, MOVE INPUT_PTR LEFT, where "INPUT_PTR" points to a tuple having the value (INPUT1, INPUT2). Block 402 can then normalize the recursive calls, searching for recursive calls that are not in the structural form of high-order functions and turning them into structural recursive calls. For example, block 402 can insert operations that do not affect the computation but that create the form of a high-order function.

Block 404 extracts high-order functions from the original program. A "high-order function" is one that can take other functions as input. High-order functions can therefore be used recursively. The term "high-order" contrasts herein to "primitive" functions, which are simply defined herein as those functions which are not high-order functions. High-order functions include such functions as "accumulate," "scan," "map," "fold," and "reduce." Primitive functions include, for example, data assignment operations that change the value of a stored variable. There are relatively few types of high-order functions, making it possible to determine the high-order functions that are present in an original program. For example, block 404 can consult a database of templates for various high-order functions. For each structural recursive call, block 404 determines which high-order function corresponds to the call by matching against the template database.

Block 406 parameterizes the extracted high-order function(s) by replacing specific data in the functions with calls to primitive functions. For example, each call to read or write a portion of memory in the scratch pad 106 is replaced by a respective primitive function. Each primitive function is associated with a respective identifier. It should be noted that multiple instances of a given operation may be present in a particular high-order function and may be represented by different respective primitive functions.

Block 408 creates traces for the extracted high-order functions. This may be performed by identifying real data in the input traces and replacing those data operations with primitive function calls by replacing the data with respective primitive function identifiers. Block 410 then trains one or more NPI models for respective higher-order functions in the program using the modified execution traces.

Block 412 creates traces for primitive functions. For each primitive function, a set of inputs is identified according to the function's definition. For example, in the case of an Accumulate high-order function, a primitive function P can have two inputs: a tuple (INPUT1, INPUT2), and the operation "carry." Training data is created for each recursive call, where the input is all values of the inputs to a function at the current status and where the output is the value that is replaced by the primitive function. For example, training data for a primitive function P can be obtained by finding real data values in the execution traces that correspond to the primitive function.

Block 414 then trains respective neural network models for each of the primitive functions using the traces created in block 412. The neural networks that are used for the training of primitive functions can be any appropriate structure in accordance with a particular problem at hand. However, it is expected that the simple primitive functions can be modeled using relatively simple neural networks, such as fully connected neural networks.

Figure 5:
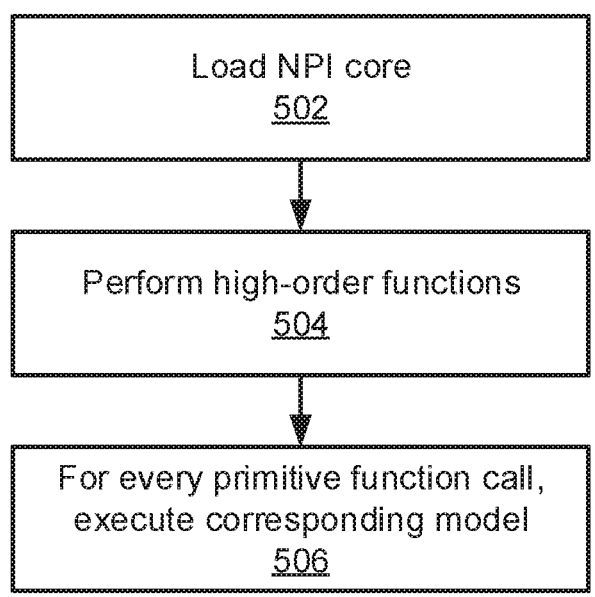
FIG. 5 is a block/flow diagram of a method for executing a new program that separates high-order functions from primitive functions to simplify the generalization of inputs in accordance with an embodiment of the present invention.

Referring now to FIG. 5, a method for executing a replicated program that has been generated by the two-level NPI of the present embodiments is shown. Block 502 loads the NPI core 102 of a generated program. Block 504 uses the NPI core 102 to perform one or more high-order functions, each of which may call one or more primitive functions to handle specific data. For each primitive function call, block 506 executes a corresponding trained model to output the particular data values or other operations that are indicated by the trained model given a current set of inputs.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B)

only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
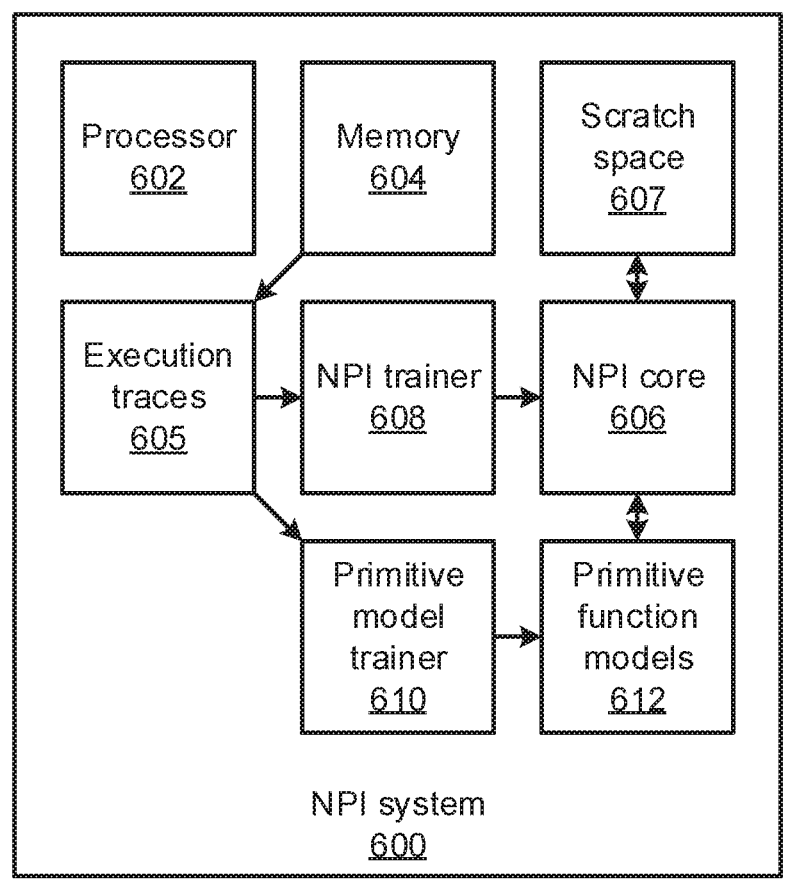
FIG. 6 is a block diagram of a system that generates a new program based on an original program using a two-level NPI learning process that separates high-order functions from primitive functions to simplify the generalization of inputs in accordance with an embodiment of the present invention.

Referring now to FIG. 6, an NPI system 600 is shown. The NPI system includes a hardware processor 602 and a memory 604 and can further include one or more functional modules. The functional modules can be implemented in the form of software that is stored in the memory 604 and that is executed by the hardware processor 602. In other embodiments, one or more of the functional modules can be implemented in the form of one or more discrete hardware components, for example in the form of application-specific integrated chips or field programmable gate arrays.

An NPI core 606 is implemented using a neural network that is trained by NPI trainer 608 using a set of execution traces. The NPI trainer 608 first parameterizes the NPI core 606 to identify instances where specific data is used and to replace those instances with primitive function calls. The NPI trainer 608 then trains the high-order function(s) of the NPI core 606 using a set of execution traces 605 stored in memory 604. A primitive model trainer 610 trains a respective primitive function model 612 for each of the primitive functions using training data that is based on a most relevant usage case.

During execution, the NPI core 606 is executed to perform the high-order function(s) of the replicated program. Any time the NPI core 606 executes a primitive function, the corresponding primitive function model 612 is used to provide an appropriate value for the operation.

Figure 7:
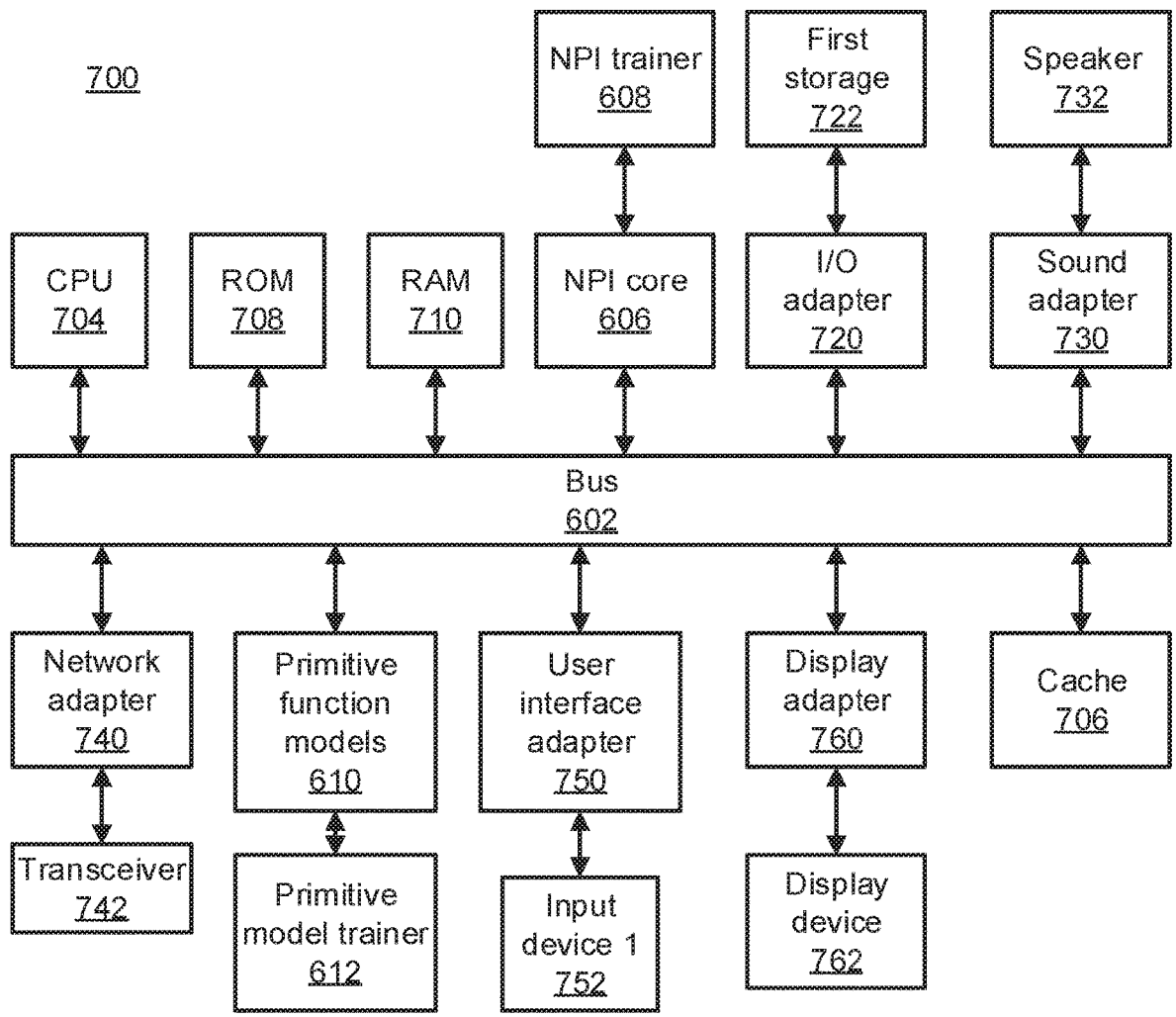
FIG. 7 is a block diagram of a processing system that can be used to implement an NPI system in accordance with an embodiment of the present invention.

Referring now to FIG. 7, an exemplary processing system 700 is shown which may represent the NPI system 600. The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a sound adapter 730, a network adapter 740, a user interface adapter 750, and a display adapter 760, are operatively coupled to the system bus 702.

A first storage device 722 is operatively coupled to system bus 702 by the I/O adapter 720. The storage device 722 can be any of a disk storage device (e.g., a magnetic or optical disk storage device), a solid state magnetic device, and so forth. The storage device 722 can be the same type of storage device or different types of storage devices.

A speaker 732 is operatively coupled to system bus 702 by the sound adapter 730. A transceiver 742 is operatively coupled to system bus 702 by network adapter 740. A display device 762 is operatively coupled to system bus 702 by display adapter 760.

A first user input device 752 is operatively coupled to system bus 702 by user interface adapter 750. The user input device 752 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input device 722 can be the same type of user input device or different types of user input devices. The user input device 752 is used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

The NPI core 606 and the primitive function models 610 also interface with the bus 602 to communicate with one another and with other hardware. The respective trainers 608 and 612 communicate with the NPI core 606 and the primitive function models 610 and access the appropriate execution traces needed for operation from an appropriate memory device.

Having described preferred embodiments of neural programmer interpreters with modeled primitives (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:
1. A method for generating a program, comprising:
parameterizing a high-order function, which takes other functions as input, to replace data of the high-order function with primitive functions using a processor;
training a neural programmer interpreter (NPI) model for the high-order function; and training respective neural network models, for each primitive function, that generate data for the NPI model when called.

2. The method of claim 1, wherein training the NPI model comprises identifying a write statement that includes an argument for a primitive function identifier.

3. The method of claim 1, wherein parameterizing the high-order function comprises identifying data value assignment operations and replacing each identified data value assignment operation with a respective primitive function.

4. The method of claim 1, further comprising determining one or more high-order functions within an original program based on execution traces of the original program.

5. The method of claim 4, further comprising normalizing the execution traces of the original program by replacing input pointers in multiple operations with tuples of respective input pointers from the multiple operations.

6. The method of claim 4, wherein each execution trace includes a log of executed system calls by the original program.

7. The method of claim 1, further comprising executing a generated program by executing the trained NPI model with a new input, wherein the trained NPI model calls the respective neural network models when a primitive function is called.

8. The method of claim 1, wherein each neural network model that represents a primitive function is implemented as a fully connected neural network.

9. The method of claim 1, wherein the NPI model is implemented as a long-short term memory neural network.

10. The method of claim 1, wherein training the respective neural network models for each primitive function comprises determining a respective training data set for each primitive function.

11. A non-transitory computer readable storage medium comprising a computer readable program for generating a program, wherein the computer readable program when executed on a computer causes the computer to perform the steps of:

parameterizing a high-order function, which takes other functions as input, to replace data of the high-order function with primitive functions using a processor;

training a neural programmer interpreter (NPI) model for the high-order function; and training respective neural network models, for each primitive function, that generate data for the NPI model when called.

12. A system for generating a program, comprising:

a neural programmer interpreter (NPI) trainer configured to parameterize a high-order function, which takes other functions as input, to replace data of the high-order function with primitive functions and to train an NPI model for the high-order function; and a primitive model trainer configured to train respective neural network models, for each primitive function, that generate data for the NPI model when called.

13. The system of claim 12, wherein the NPI trainer is further configured to identify a write statement that includes an argument for a primitive function identifier.

14. The system of claim 12, wherein the NPI trainer is further configured to identify data value assignment operations and to replace each identified data value assignment operation with a respective primitive function.

15. The system of claim 12, wherein the NPI trainer is further configured to determine one or more high-order functions within an original program based on execution traces of the original program.

16. The system of claim 15, wherein the NPI trainer is further configured to normalize the execution traces of the original program by replacing input pointers in multiple operations with tuples of respective input pointers from the multiple operations.

17. The system of claim 15, wherein each execution trace includes a log of executed system calls by the original program.

18. The system of claim 12, wherein the trained NPI model is configured to call the respective neural network models when a primitive function is called.

19. The system of claim 12, wherein each neural network model that represents a primitive function is implemented as a fully connected neural network.

20. The system of claim 12, wherein the NPI model is implemented as a long-short term memory neural network.

* * * * *